(12) United States Patent
Anderson et al.

(10) Patent No.: US 6,776,935 B2
(45) Date of Patent: Aug. 17, 2004

(54) CONTINUOUS PROCESS FOR MAKING GLITTERING CUBE CORNER SHEETING

(75) Inventors: Richard W. Anderson, St. Paul, MN (US); John L. Vandenberg, Maplewood, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 292 days.

(21) Appl. No.: 09/916,063

(22) Filed: Jul. 26, 2001

(65) Prior Publication Data

US 2001/0042931 A1 Nov. 22, 2001

Related U.S. Application Data

(63) Continuation of application No. 09/412,772, filed on Oct. 4, 1999, now abandoned.

(51) Int. Cl.[7] .............................................. B29D 11/00
(52) U.S. Cl. .......................... 264/1.6; 264/1.9; 264/2.7; 264/284
(58) Field of Search .......................... 264/1.6, 1.7, 1.9, 264/2.7, 284, 293; 425/385

(56) References Cited

U.S. PATENT DOCUMENTS

| | | | |
|---|---|---|---|
| 4,332,847 A | * | 6/1982 | Rowland ..................... 264/2.7 |
| 4,588,258 A | | 5/1986 | Hoopman |
| 4,601,861 A | * | 7/1986 | Pricone et al. ................ 264/1.6 |
| 4,775,219 A | | 10/1988 | Appeldorn et al. |
| 4,895,428 A | | 1/1990 | Nelson et al. |
| 5,122,902 A | | 6/1992 | Benson |
| 5,138,488 A | | 8/1992 | Szczech |
| 5,450,235 A | | 9/1995 | Smith et al. |
| 5,763,049 A | | 6/1998 | Frey et al. |
| 5,770,124 A | | 6/1998 | Marecki et al. |
| 5,814,355 A | | 9/1998 | Shusta et al. |
| 5,840,405 A | | 11/1998 | Shusta et al. |
| 5,948,488 A | | 9/1999 | Marecki et al. |
| 6,096,247 A | * | 8/2000 | Ulsh et al. .................... 264/2.7 |
| D444,953 S | | 7/2001 | Marecki et al. ................ D5/99 |

FOREIGN PATENT DOCUMENTS

JP         55030941         3/1980         ........... B29C/15/00

OTHER PUBLICATIONS

"Coolstream LSTF, The Future is 'Gentle Touch' Fusing", Bandwise Reliant Ltd., Buckinghamshire HP5 2PY UK, May 1997.

* cited by examiner

*Primary Examiner*—Mathieu D. Vargot
(74) *Attorney, Agent, or Firm*—Rudolph P. Hofmann, Jr.; Stephen C. Jensen; Jay R. Pralle

(57) ABSTRACT

A continuous process for imparting a striking glittering or sparkling appearance to a roll of initially non-glittering cube corner sheeting includes exposing the sheeting to a combination of heat and pressure. The process includes passing the sheeting through an extended heated zone and applying pressure to the sheeting after it has been heated. At least one belt is employed to support or carry the sheeting as the sheeting is passed through the heated zone and as the pressure is applied. In one embodiment the sheeting is sandwiched between a pair of endless belts that pass through the extended heated zone, the nip, and a cooling zone downweb of the nip. The process is particularly advantageous for converting rolls of non-glittering cube corner sheeting into rolls of glittering cube corner sheeting.

20 Claims, 3 Drawing Sheets

CONTINUOUS PROCESS FOR MAKING GLITTERING CUBE CORNER SHEETING

This is a continuation of application Ser. No. 09/412,772 filed Oct. 4, 1999 now abandoned.

BACKGROUND

The present invention relates to methods of manufacturing reflective sheeting, with particular application to cube corner retroreflective sheeting.

The reader is directed to the glossary provided at the end of the specification for guidance on the meaning of certain terms used herein.

It is known for manufacturers of high visibility garments, such as vests worn by construction work zone crews, to use laminating machines to bond strips of beaded retroreflective sheeting to a fabric, the composite fabric then being cut, sewn, or otherwise configured to produce the desired garment. The laminating machines in such manufacturing processes utilize a pair of endless belts that support and hold the retroreflective sheeting and fabric as they pass through an extended heated zone. The heat activates an adhesive provided on one side of the retroreflective sheeting. Such machines also pass the components thus heated through a nip formed between two unheated rubber rollers to secure the retroreflective sheeting to the fabric in a lasting bond. In these processes, the integrity of the retroreflective sheeting is undisturbed because the tiny beads responsible for retroreflectivity are unaffected by the temperatures and pressures employed.

U.S. Pat. No. 5,770,124 (Marecki et al.), U.S. Pat. No. 5,814,355 (Shusta et al.), U.S. Pat. No. 5,840,405 (Shusta et al.), and U.S. Pat. No. 5,948,488 (Marecki et al.) (collectively, the "Marecki et al. patents") disclose a wide variety of methods of manufacturing glittering cube corner sheeting. Both batch and continuous processes are disclosed for converting non-glittering cube corner sheeting, whose cube corner elements are initially well-ordered, into glittering cube corner sheeting. Disclosed processes involve exposing the non-glittering cube corner sheeting to heat, pressure, or a combination thereof.

Sheeting sold in long continuous rolls has certain advantages over sheeting sold in other forms such as individual rectangular sheets. One advantage is better compatibility with automated converting operations in which strips or other pieces of the sheeting are applied to end-use products such as shoes, garments, or the like. In connection with attempting to convert entire rolls of non-glittering cube corner sheeting into corresponding rolls of glittering cube corner sheeting, certain difficulties were encountered when simply feeding the non-glittering cube corner sheeting (together with a textured cloth material in contact with the cube corner elements) into a heated nip using a heated roller or rollers. The high pressures and temperatures required to produce a glittering appearance tended to cause the rubber surface of the roller to break down, and also sometimes resulted in shrinkage or puckering of the sheeting after passing through the nip. Furthermore, only relatively slow process speeds could be achieved.

An improved process for converting a non-glittering cube corner sheeting to a glittering cube-corner sheeting, not subject to the foregoing problems and capable of handling entire rolls of cube corner sheeting, would be highly desirable.

BRIEF SUMMARY

The present invention is a specific improvement or niche within the very broad and generic concepts that are taught and/or claimed in the Marecki et al. patents. I.e., the improvement relates to known processes for imparting a glittering or sparkling appearance to an initially non-glittering cube corner sheeting by exposing the sheeting to heat, pressure, or a combination thereof. Such an improvement as disclosed herein typically includes (1) passing the sheeting through an extended heated zone, (2) applying pressure to the sheeting after it has been heated in the extended heated zone, and (3) supporting the sheeting with at least one belt as the sheeting is passed through the extended heated zone, and as the pressure is applied thereto. The extended heated zone preferably has a length in the downweb direction at least as great as a width of the sheeting. The applied pressure is preferably provided by a pair of rollers that are unheated or at least cooler than temperatures within the extended heated zone. The at least one belt is preferably a pair of endless belts between which the sheeting is supported as it is heated, as the pressure is applied, and further as it is at least partially cooled after application of the pressure.

Figure 1:
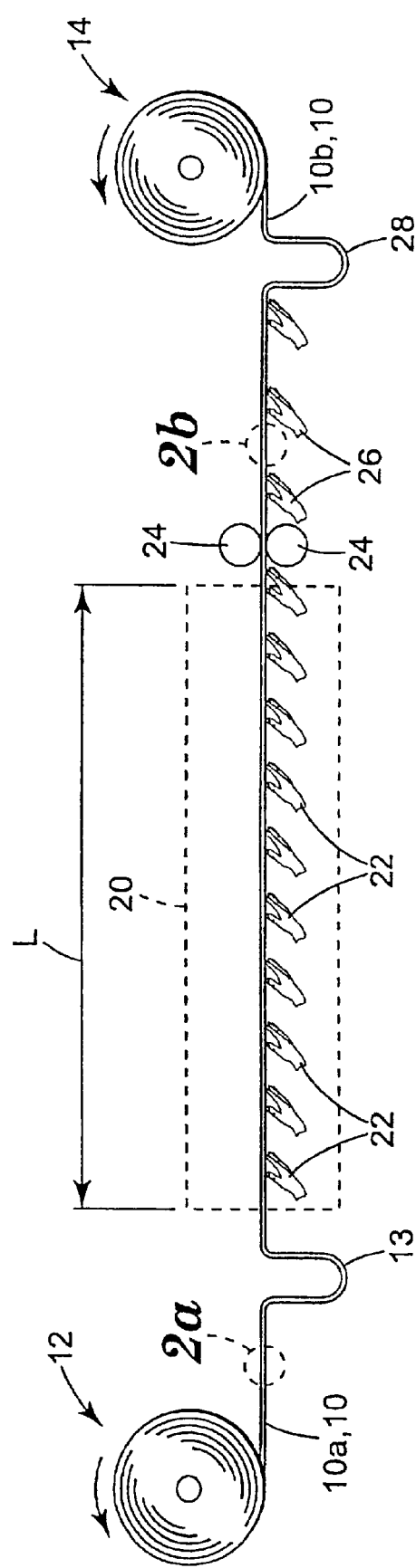
FIG. 1 is a schematic view that depicts aspects of the improved process described herein.

In the drawings, the same reference symbol is used for convenience to indicate elements that are the same or that perform the same or a similar function.

DETAILED DESCRIPTION OF THE ILLUSTRATIVE EMBODIMENTS

FIG. 1 is a schematic view depicting in a general way certain aspects of the improved process. In sum, a first cube corner sheeting 10a is provided at an unwind station 12, and is processed using heat and pressure so as to yield a second cube corner sheeting 10b that is collected at a windup station 14. The process shifts the positions of the cube corner elements initially provided in sheeting 10a such that sheeting 10b has an aesthetic glittering or sparkling appearance.

If desired, unwind station 12 can be eliminated and sheeting 10a can instead be provided at the output end of a conventional manufacturing line that produces such sheeting. This would eliminate unnecessary intermediate steps of winding up sheeting 10a into a roll, handling and transporting the roll, and unwinding the roll at station 12. Further, if additional process steps are desired after the glittering sheeting 10b is made, such as the application of a conventional seal film in a closed cell pattern to maintain an air interface at the cube corner elements, then such additional process steps can be substituted for windup station 14.

As shown in FIG. 1, sheetings 10a and 10b are both part of a continuous length of cube corner sheeting material, designated by reference numeral 10. Sheeting 10a comprises a structured surface in which cube corner elements are formed. Many different geometries of such cube corner elements are known, and can be used with the present process, including but not limited to those disclosed in U.S. Pat. No. 4,588,258 (Hoopman), U.S. Pat. No. 4,775,219

Figure 2A:
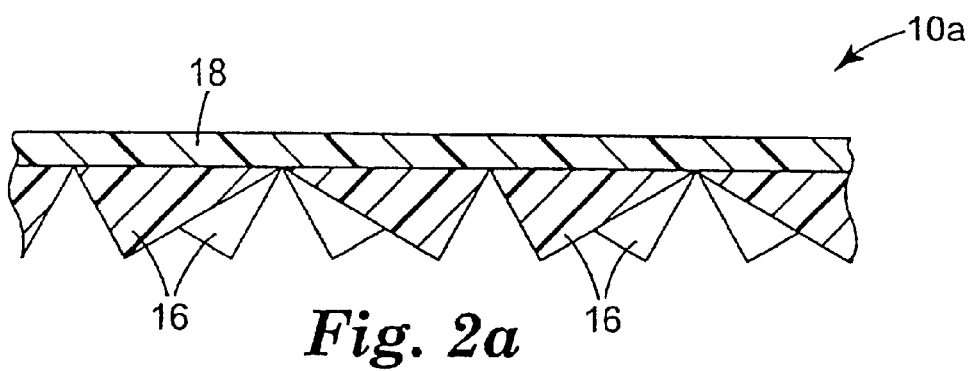
FIG. 2a is a greatly magnified side sectional view of a cube corner sheeting at the input of the process.

(Appeldorn et al.), U.S. Pat. No. 4,895,428 (Nelson et al.), U.S. Pat. No. 5,122,902 (Benson), U.S. Pat. No. 5,138,488 (Szczech), and U.S. Pat. No. 5,450,235 (Smith et al.). So-called "truncated" cube corner elements (e.g. where each of the three faces is a triangle) and "full" cube corner elements (e.g. where each of the three faces is a square) are both useable. Sheetings that are most suitable for the present process are those having a cube corner layer attached to a separate overlay layer, as seen in the sectional view of FIG. 2a, where cube corner elements 16 in the cube corner layer are preferably composed of a material having a softening temperature that is higher than the softening temperature of the material making up the overlay 18. Thus, heating the sheeting to a temperature between the respective softening temperatures permits reorienting the cube corner elements in the softened overlay with an applied pressure without destroying the shape of each cube corner element. As shown, cube corner elements 16 are arranged in a uniform repeating pattern that does not impart a glittering appearance to the first sheeting 10a.

Returning to FIG. 1, first sheeting 10a is passed through a heated zone 20 where the sheeting is exposed to a maximum process temperature $T_{MAX}$. Zone 20 extends for a substantial distance L along the direction of travel of the sheeting, and thus is referred to as an extended heated zone. Such an extended zone 20 promotes even heating of the sheeting without puckering caused by localized hot spots. Also, the extended nature of zone 20 permits greater line speeds since the dwell time of the sheeting in the elevated temperature environment is longer. Preferably, L is sufficiently long to bring the sheeting up to the desired temperature by the time it leaves the zone 20, for web speeds of at least about 10 ft/min (50 mm/sec), and more preferably for web speeds of at least about 15 ft/min (75 mm/sec). ("Web" is used here to generally refer to sheeting 10 and any other layers that may be processed simultaneously as discussed below. "Downweb" refers to the direction of travel of the web, and "upweb" is the opposite direction.) As a rule of thumb, L is at least as great as the overall width of the sheeting, which is the dimension of the sheeting along a width axis (not shown in FIG. 1 but perpendicular to the plane of the figure).

Of course, heated zone 20 also extends along the width axis so that it heats sheeting 10a along its entire width. Good temperature uniformity along the width axis is desirable for a uniform glittering appearance across the entire sheeting. Temperature uniformity along the direction of travel of the web is not as critical, and indeed a preselected nonuniform temperature profile may be desirable to avoid shrinkage or puckering of the web due to excessively abrupt temperature changes. Heating of the sheeting in zone 20 can be accomplished in any conventional manner, such as with electrically resistive elements, infrared lamps, microwave emitters, or any other conventional means. Whatever the heating mechanism used, it should be capable of stable control and uniform application of heat.

Importantly, as the web passes through heated zone 20, it is supported or guided therethrough as indicated generically in the drawing by "hands" 22. Hands 22 support the web by holding it in position as it moves along to keep the web from falling, sinking, or slipping, keeping the tension in the web low enough to avoid stretching or elongation. This function can be readily accomplished by one or more belts arranged to contact the web and move in unison with it. By supporting the sheeting 10 in this fashion, high process temperatures $T_{MAX}$ near or above the softening point of overlay 18 can be used without having the sheeting deform or distort from web tension or from its own weight.

A loop 13 is shown upweb of heated zone 20 to indicate low tension in the sheeting 10a as it enters the heated zone.

As the sheeting 10 emerges from the downweb end of heated zone 20, it is thermally prepared for rearrangement of the cube corner elements by application of pressure. The sheeting 10a has a temperature at or above the softening temperature of overlay 18, i.e., the temperature at which overlay 18 can be irreversibly deformed by moderate forces, pressures, or tensions. The sheeting temperature is however below the corresponding softening temperature of cube corner elements 16. Pressure can be applied in a variety of known ways, but preferably via a nip formed between two rollers 24, one of which is motor-driven. Rollers 24 need not be and preferably are not actively heated in order to avoid premature damage or degradation of the roller surfaces. The roller surfaces are thus generally cooler than the temperatures exhibited in heated zone 20, and in particular cooler than $T_{MAX}$. The roller surface material and hardness can be chosen as desired to produce the aesthetic glittering effect for the particular construction of cube corner sheeting material 10 employed. Due consideration may also be given to minimizing or limiting any drop in retroreflective performance of the sheeting, balancing such a drop with the amount of glittering effect produced. Rubber rollers are advantageous for creating a relatively wide pressure zone at the nip, compared to steel rollers for example. If desired, one or both rollers can have a roughened or textured surface to aid in the rearrangement of the cube corner elements.

Figure 2B:
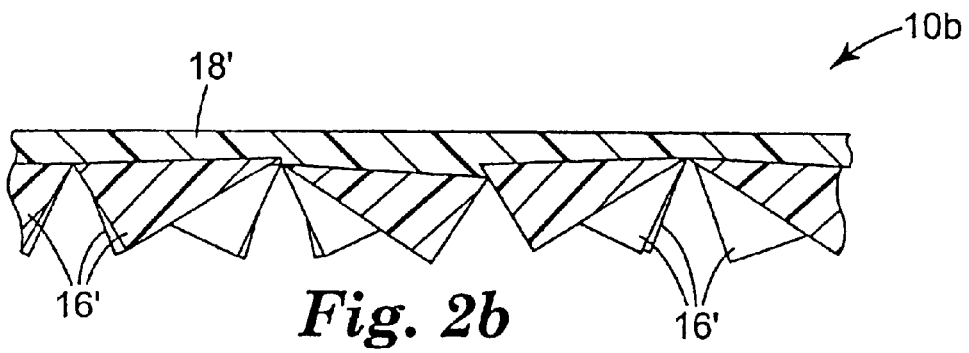
FIG. 2b is a greatly magnified side sectional view of a cube corner sheeting at the output of the process.
Figure 3:
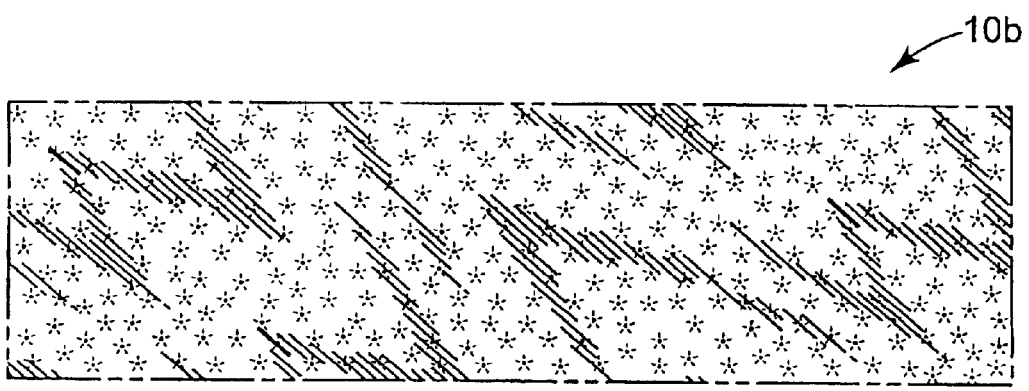
FIG. 3 is a front view of the cube corner sheeting at the output of the process.

The pressure applied by rollers 24 rearranges the cube corner elements in the softened overlay layer, typically in a random or quasi-random manner, as shown in the enlarged sectional view of FIG. 2b and the front view of FIG. 3. In FIG. 2b, reference number 16' refers to cube corner elements 16 from FIG. 2a after rearrangement. Elements 16' are shifted and tilted with respect to each other at angles sufficient to produce glitter. Reference number 18' refers to overlay 18 from FIG. 2a after being deformed by the rearranged cube corner elements 16'. From the front of sheeting 10b, i.e., when viewed through overlay 18', a glittering appearance is observed over a wide range of viewing and illumination geometries. FIG. 3 shows a representative front view of a portion of the sheeting, where the "stars" in the figure represent glitter that is displayed by the sheeting when exposed to light. Such light may be incident from either the front or the back side of sheeting 10b.

Turning once again to FIG. 1, "hands" 26 are shown supporting or guiding the sheeting material 10b immediately downweb of rollers 24. Such support is provided to ensure the integrity of the glittering sheeting while it is still hot and as it advances towards windup station 14. The support is thus desirably maintained until the overlay 18' has cooled well below its softening temperature. A loop 28 in sheeting material 10, 10b appears in the figure to indicate that windup station 14 does not impart significant tension to the web.

The improved method properly practiced thus is capable of transforming an entire roll of non-glittering cube corner sheeting into a roll of glittering cube corner sheeting. Smaller individual pieces of sheeting can alternatively be processed. The improved method produces excellent quality glittering sheeting at a rapid rate by virtue of the extended heated zone and the support provided to the web in the heated zone and at the point of pressure application. Web speeds can be increased even further by simply lengthening the extended heated zone, thus maintaining the necessary dwell time.

EXAMPLE

Figure 4:
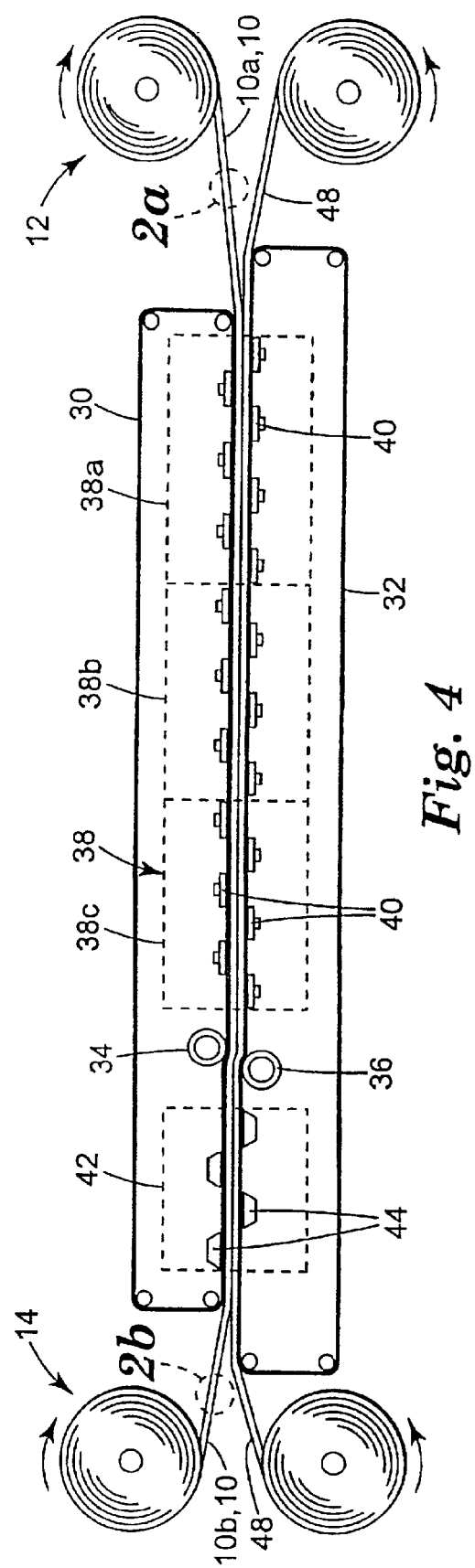
FIG. 4 is a schematic view of a more specific arrangement suitable for carrying out the disclosed process.

FIG. 4 shows a schematic view of a more specific arrangement suitable for carrying out the improved process.

The process was carried out using a conventional conveyor-type laminating machine, available from Bandwise Reliant Ltd. (Buckinghamshire, United Kingdom) under the designation "Coolstream LSTF". The machine includes a pair of endless belts 30,32 that are driven synchronously with a pair of pressure rollers 34,36. Also included is an extended heated zone 38 that has three separately controllable sub-zones, labeled 38a, 38b, 38c. (If desired, the upper and lower portions of each sub-zone can be controlled independently, for a total of six sub-zones.) The overall length of zone 38 is about 65 inches (approx. 1.6 meters). Electrical heating elements 40, made of grade 6063A/T6 high thermal conductivity alloy for fast temperature response, contact belts 30,32 in a staggered fashion as shown to provide the necessary heating. The surface of each heating element in contact with the belt can be described as a flat rectangular plate that spans the width of the belt. Heating elements 40 are staggered between top and bottom such that the trailing edge of an upper element overlaps the leading edge of a lower element, and vice versa, so that there is always either an upper or a lower element in contact with the belts at any given time. Elements 40 in contact with upper belt 30 are "floating" to provide a constant, gently applied but firm pressure onto the belts to prevent web movement during transport through the machine. The web is thus supported between the belts as it travels through extended heated zone 38, between rollers 34,36, and downweb through a cooling zone 42.

Cooling zone 42 includes aluminum modules 44, also in contact with belts 30,32 as shown. Cooling is accomplished using chilled water that is pumped through modules 44. Adjustments can be made by varying the flow rate of the chilled water through the modules. A 50% flow setting was found optimal. The cooling zone length was about 20 inches (approx. ½ meter).

The cube corner sheeting 10a used in this example was a 35 inch (approx. 0.9 meter) wide, 50 meter long jumbo roll of 3M™ Scotchlite™ Reflective Material Series 6200 High Gloss Trim available from Minnesota Mining and Manufacturing Co. (St. Paul, Minn.). Such sheeting is similar to that shown in FIG. 2a. The cube corner elements 16 were about 3.5 mils (approx. 90 μm) high from base to apex and composed of an acrylate material, which has a glass transition temperature well above 180° C. The overlay 18, about 10 mils (approx. 0.25 mm) thick, was composed of a vinyl material having a softening temperature of about 140–150° C. The sheeting 10a also included a top film (not shown in FIGS. 2a or 2b but disposed on the top side of layers 18, 18') composed of polyethylene terephthalate (PET) and having a thickness of about 2 mils (approx. 50 μm). This material has a softening temperature of about 250–270° C. The top film can be readily peeled off of overlay 18 after processing; during the process it helps transport the cube corner sheeting 10 in its delicate heated state, and keeps the sheeting 10 from sticking to belt 30. It also ensures a glossy top surface finish to sheeting 10b for optimum visual effect.

This cube corner sheeting 10a was fed through the laminator as shown in FIG. 4, with the downweb direction going from right to left rather than vice versa as in FIG. 1. Web speed was controlled to 15 ft/min (75 mm/sec), for a dwell time in zone 38 of about 22 sec. Dwell times of at least about 20 seconds are considered suitable for the particular cube corner sheeting that was used. Optimization of the process—such as selection of zone temperatures, belt construction, roller pressure, use of a fabric roll, and so on, discussed in paragraphs that follow—yielded a striking glittering appearance that was highly uniform across the entire width and down the entire length of the sheeting.

A 70 meter long roll of textured material 48 was unwound simultaneously with sheeting 10 as shown. Textured material 48 consisted of fabric composed of Nomex™ brand synthetic fiber, marketed by E.I. du Pont de Nemours and Company. The fabric was about 10 mils (approx. 0.25 mm) thick. Such a fabric resists shrinkage at elevated temperatures, and thus is understood in the art to be "heat stable" or "low shrinkage". The low shrinkage characteristic was desirable to avoid puckering or other disfigurement of the cube corner sheeting. The particular fabric used was pretreated or "heat set" at 450° F. (approx. 230° C.) or higher before being used in the process. The fabric contacts the cube corner side of sheeting 10 and passes through the heated zone 38, through the nip formed between rollers 34, 36, and through cooling zone 42 simultaneously with sheeting 10, before being separated therefrom upon exiting the laminating machine. By changing the weave of the heat stable fabric used, different patterns of glittering can be achieved in the sheeting 10b.

At the beginning of the process, after allowing the temperature in zone 38 to stabilize, it was found preferable to initially feed only the textured material 48 into the laminator between belts 30, 32. As the textured material 48 emerged from the laminator, it was attached to the core on the lower windup station. The material 48 acted as a heat sink when it initially entered heated zone 38, and a slight drop in sub-zone 38a–c temperatures was observed. After the temperatures stabilized, cube corner sheeting 10 was then fed between belts 30,32 as shown, simultaneously with textured material 48. By passing an initial portion of material 48 through the laminator by itself, sub-zones 38a–c did not experience the combined heat sink effect of both sheeting 10 and material 48 all at once. The heat sink effect of the combination of materials was observed to cause a drop in temperature in sub-zones 38a–c large enough to cause the first 10 to 15 meters of sheeting 10 to have little to no sparkling appearance. Feeding an initial portion of textured material 48—determined to be at least about 10 meters for these particular conditions—into the laminator before simultaneously feeding sheeting 10 solves this problem and allows the heated zone temperatures to recover somewhat. The cube corner sheeting 10 is then fed into the laminator on top of the textured material 48 with the cube corner elements 16 facing down into the material 48. The zone temperatures were observed to dip slightly, but not enough to prevent the finished sheeting 10 from glittering. As the sheeting 10b emerged from the laminator, it was peeled off of textured material 48 and attached to the core on the upper windup at station 14. Tensions were adjusted as needed to get a clean separation of sheeting 10b and textured material 48. When the entire roll of non-glittering sheeting 10a was processed into glittering sheeting 10b, the roll of sheeting 10b was ready for further processing such as slitting or alternately for packaging and shipping. The remainder of the textured material 48 was run through the laminator, and the resulting roll of this material was then moved over to the lower unwind station for re-use in processing the next roll of cube corner sheeting 10a.

If desired, the unwinding and winding operations for textured material 48 can be avoided by using a continuous belt of such material. Alternatively, textured material 48 can be eliminated altogether with appropriate surface treatment of the side of belt 32 that faces cube corner elements 16,16'.

Belts 30,32, available through Bandwise Reliant Ltd. under product code DR230A-K, utilize a woven interior of Kevlar™ brand synthetic fibers. The woven interior is made using a tube-knitting process that results in a seamless construction. A seamless construction is important to avoid unwanted impressions that repeat in the finished glittering sheeting 10*b*. Coated onto the woven interior is a first coating of an anti-static carbon fiber glass known as petrotetraflorethelene (ptfe), which also has high thermal conductivity. Finally, an outer coating of Teflon™ brand synthetic polymer is provided for added smoothness of the belt surface. Belts 30,32 so constructed functioned admirably in the process described. The overall length of belts 30,32 was about 12 and 18 feet respectively (approx. 3.6 and 5.5 meters). Both belts had a width of about 70 inches (approx. 1.8 meters).

Other belt configurations can also be used to support the cube corner sheeting as it passes through the extended heated zone and nip. For example, a vertical rather than horizontal web path can be used. Belts that are other than endless can be used. The belts discussed above for the example have a smooth outer surface as described, but the surface is not flat but rather slightly textured or undulating as a result of the woven interior. Flat, smooth belts made for example of 100% Teflon™ brand synthetic polymer, or roughened belts as discussed above in connection with eliminating the textured material 48, can be used. Structures or mechanisms not typically considered to be belts, such as a bank of small closely-spaced rollers, could also be used as a belt so long as they provide the necessary support for the cube corner sheeting 10.

Temperature settings within extended heated zone 38 found to provide optimum results in this example were about 175° C. for heating elements 40 within sub-zone 38*a*, and about 180° C. for heating elements 40 within sub-zones 38*b* and 38*c*. Thus, the maximum process temperature $T_{MAX}$ in the example was about 180° C. The degree of glittering in sheeting 10*b* (for the particular cube corner sheeting tested) was found to be quite sensitive to these temperature settings, with temperatures 5 to 10 degrees C. lower resulting in little to no glittering effect, and temperatures 5 to 10 degrees C. higher resulting in the cube corner sheeting 10 sticking to upper belt 30.

Of course, different temperature settings will in general be required for cube corner sheetings using other constructions or materials.

As belt 32 travels from the output of the laminator to the input of heated zone 38, it is re-heated to some extent by passing underneath zone 38 within the framework of the particular laminator used. After this re-heating however it is guided through a horizontal area open to room air (for loading individual samples onto the belt), just prior to entering the heated zone 38. It was found desirable to cover up the horizontal loading area so as to avoid undesired cooling of belt 32 prior to entering the heated zone. Alternatively, belt 32 can be shortened and re-routed to bypass the horizontal loading area.

Conventional rollers 34,36 were used in the example. Both rollers had an inner metallic shell, and an outer rubber portion about ¼ inch thick, the rubber portion having a surface coating of Teflon™ brand synthetic polymer. The rollers were about 72 inches (approx. 1.8 meters) long, had a nominal radius of about 2 inches (50 mm), and were each crowned by about 2 to 3 mils (50–75 μm) for the purpose of providing uniform pressure across the rollers at the target pressure, and thus uniform glittering appearance across the sheeting 10*b*. That is, the radius of each roller at its center was 2–3 mils greater than its radius at either end. The surface of the rollers had a hardness in the range of 60 to 80 durometer. For the particular cube corner sheeting of the example, a roller hardness of about 60 to about 80 durometer ensures proper surface flex.

The optimum pressure setting for the nip between the rollers (with the web present between the rollers) was determined to be about 12 pounds per linear inch of web width (approx. 2100 N/m). This setting provided a high quality glittering appearance uniformly across the entire web. Settings from about 10 to about 30 pounds per inch were found to produce glittering in sheeting 10*b*, although extremes within this range did not give good uniformity across the web.

The rollers 34,36 were not actively heated. Their proximity to heated zone 38 and their contact with the heated web produced a temperature increase, but not enough of an increase to cause the rollers to degrade as mentioned in the Background section above.

Glossary of Certain Terms

"Cube corner" or "cube corner element": an arrangement of three small neighboring faces on a structured surface that are substantially mutually perpendicular so as to reflect incident light back towards the vicinity of the light source, but is also used broadly to include structures having at least three neighboring faces that are not substantially mutually orthogonal.

"Glitter", "glittering", and cognates thereof: when used in connection with sheeting, mean a multiplicity of discrete regions of light that appear as distinct points of light, each of which may be noticed by the unaided eye of an ordinary observer when light is incident on the sheeting, but which points of light disappear or become unnoticeable to the eye of the same observer when either the angle of the incident light source to the sheeting, the angle of observation, the sheeting's orientation, or a combination thereof are changed.

"Nip": a gap or space.

"Softening temperature" or "softening point": the lowest temperature at which a given material can feasibly be irreversibly deformed by moderate forces, pressures, or tensions, including the range from about 5 to about 50 lbs/linear inch (approx. 900 to 9000 N/m) as exhibited in nip roller arrangements described above. If such a temperature does not exist for a given material, then the glass transition temperature $T_g$ of the material, wherein the material structure changes from a crystalline state to an amorphous state or vice versa.

All U.S. patents and patent applications referred to herein are incorporated by reference. Although the present invention has been described with reference to preferred embodiments, workers skilled in the art will recognize that changes can be made in form and detail without departing from the spirit and scope of the invention.

What is claimed is:

1. In a method for making a glittering cube corner sheeting, which method comprises:

providing a first sheeting having cube corner elements arranged thereon in an arrangement that does not give rise to a glittering appearance; and exposing the first sheeting to heat, pressure, or a combination thereof to produce a second sheeting in which the cube corner elements are rearranged to give the second sheeting a glittering appearance;

the improvement wherein the exposing step comprises:

passing the first sheeting through an extended heated zone;

applying pressure to the first sheeting after it has been heated in the extended heated zone; and supporting the first sheeting with at least one belt during the passing and applying steps.

2. The method of claim 1, wherein the first sheeting is provided from an unwind roll and the second sheeting is collected on a take-up roll, the first and second sheetings being part of a continuous length of cube corner sheeting material.

3. The method of claim 1, wherein the first sheeting comprises a film that carries the cube corner elements, the film having a softening temperature lower than that of the cube corner elements, and wherein the extended heated zone exposes the first sheeting to a temperature $T_{MAX}$ at or above the softening temperature of the film but below the softening temperature of the cube corner elements.

4. The method of claim 1, wherein the first sheeting has a sheeting width and the extended heated zone has a length L in the direction of travel of the first sheeting that is at least as great as the sheeting width.

5. The method of claim 1, wherein the extended heated zone has a length L sufficiently great so that the first sheeting has a dwell time in the extended heated zone of at least about 20 seconds.

6. The method of claim 5, wherein the first sheeting passes through the extended heated zone at a speed of at least about 15 feet per minute.

7. The method of claim 1, wherein the second sheeting is formed by the applying pressure step, the method further comprising:

providing a cooling zone;

passing the second sheeting through the cooling zone; and supporting the second sheeting with the at least one belt as the second sheeting is passed through the cooling zone.

8. The method of claim 7, wherein the pressure is applied to the first sheeting by passing the first sheeting through a nip formed by at least one roller, the method further comprising:

contacting the first sheeting with a textured material at least at the nip; and separating the textured material from the second sheeting downweb of the cooling zone.

9. The method of claim 8, wherein the at least one belt is included in a pair of endless belts that carry the first sheeting and the textured material through the extended heated zone and the nip, and that carry the second sheeting and the textured material through the cooling zone.

10. The method of claim 1, wherein the at least one belt is included in a pair of endless belts that carry the first sheeting through the extended heated zone.

11. The method of claim 10, wherein the at least one belt contacts at least one heating element in the extended heated zone.

12. The method of claim 11, wherein heating elements are provided on both sides of the first sheeting in the extended heated zone.

13. In a method for making a glittering cube corner sheeting, which method comprises:

providing a first sheeting having cube corner elements arranged thereon in an arrangement that does not give rise to a glittering appearance; and exposing the first sheeting to heat, pressure, or a combination thereof to produce a second sheeting in which the cube corner elements are rearranged to give the second sheeting a glittering appearance;

the improvement wherein the exposing step comprises:

passing the first sheeting through an extended heated zone;

passing the first sheeting through a nip formed by at least one roller after the first sheeting has been heated in the extended heated zone; and supporting the first sheeting with at least one belt during the two passing steps.

14. The method of claim 13, wherein the extended heated zone exposes the first sheeting to a maximum temperature of $T_{MAX}$, and the at least one roller is cooler than $T_{MAX}$.

15. The method of claim 13, wherein the nip is formed by two rollers.

16. The method of claim 15, wherein the two rollers are not actively heated.

17. The method of claim 13, wherein the at least one roller has a surface hardness of about 60 to about 80 durometer.

18. The method of claim 13, further comprising:

providing a textured material; and covering the cube corner elements of the first sheeting with the textured material at least at the nip.

19. The method of claim 18, wherein an initial portion of the textured material is passed through the extended heated zone before passing the cube corner sheeting material through the extended heated zone.

20. The method of claim 18, wherein the extended heated zone exposes the first sheeting to a maximum process temperature $T_{MAX}$, the method further comprising:

pretreating the textured material by exposing it to a temperature higher than $T_{MAX}$.

\* \* \* \* \*